US012649519B2

(12) United States Patent
Kanda

(10) Patent No.: US 12,649,519 B2
(45) Date of Patent: Jun. 9, 2026

(54) CONTROL DEVICE FOR VEHICLE, CONTROL METHOD FOR VEHICLE, AND NONTRANSITORY COMPUTER STORAGE MEDIUM

(71) Applicant: TOYOTA JIDOSHA KABUSHIKI KAISHA, Toyota (JP)

(72) Inventor: Takahiro Kanda, Ebina (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 38 days.

(21) Appl. No.: 18/738,267

(22) Filed: Jun. 10, 2024

(65) Prior Publication Data

US 2025/0050944 A1     Feb. 13, 2025

(30) Foreign Application Priority Data

Aug. 7, 2023     (JP) ................................. 2023-128740

(51) Int. Cl.
*B62D 15/02* (2006.01)
*G06V 20/56* (2022.01)
*B60W 50/14* (2020.01)

(52) U.S. Cl.
CPC ......... *B62D 15/025* (2013.01); *B62D 15/029* (2013.01); *G06V 20/588* (2022.01); *B60W 50/14* (2013.01)

(58) Field of Classification Search
CPC .. B62D 15/025; B60W 2552/53; B60W 30/12
See application file for complete search history.

(56) References Cited

U.S. PATENT DOCUMENTS

| | | | |
|---|---|---|---|
| 7,692,534 B2 | 4/2010 | Kataoka et al. | |
| 8,352,124 B2 | 1/2013 | Taguchi | |
| 8,682,500 B2 | 3/2014 | Sakugawa | |
| 8,818,634 B2 | 8/2014 | Fujita et al. | |
| 9,168,953 B2 | 10/2015 | Mitsumoto et al. | |
| 9,645,577 B1 * | 5/2017 | Frazzoli ........... | B60W 60/0016 |
| 9,714,034 B2 | 7/2017 | Otake et al. | |
| 9,880,558 B2 | 1/2018 | Nakamura | |
| 9,902,399 B2 | 2/2018 | Torii et al. | |
| 10,345,443 B2 | 7/2019 | Masui et al. | |
| 10,611,240 B2 | 4/2020 | Masui et al. | |
| 11,163,310 B2 * | 11/2021 | Imai ...................... | B60W 30/10 |
| 2017/0336788 A1 * | 11/2017 | Iagnemma .......... | B60W 30/143 |
| 2018/0025646 A1 * | 1/2018 | Jeon ..................... | G05D 1/0077 |
| | | | 701/41 |
| 2019/0278280 A1 * | 9/2019 | Imai ..................... | B60W 30/09 |

(Continued)

FOREIGN PATENT DOCUMENTS

JP     2010-49382 A     3/2010

*Primary Examiner* — Long T Tran
(74) *Attorney, Agent, or Firm* — Oblon, McClelland, Maier & Neustadt, L.L.P.

(57)     ABSTRACT

A control device for a vehicle is configured to detect road markings on a road based on outside environment data relating to an environment around the vehicle, perform driver's assistance for warning of or avoiding departure of the vehicle from a running lane based on results of detection of road markings, and, if the road markings include markings indicating a neutral zone in which running of the vehicle is not recommended, change the conditions for actuation of driver's assistance so that driver's assistance with respect to entry into the neutral zone is suppressed.

10 Claims, 3 Drawing Sheets

(56)　　　　　　References Cited

U.S. PATENT DOCUMENTS

| | | | |
|---|---|---|---|
| 2020/0125862 A1* | 4/2020 | Lee | G06F 18/23 |
| 2021/0039650 A1* | 2/2021 | Yu | B60W 30/095 |
| 2021/0043088 A1* | 2/2021 | Yu | B60W 30/18163 |
| 2021/0072405 A1* | 3/2021 | Kwon | G06V 20/582 |
| 2021/0319237 A1* | 10/2021 | Kim | G06V 10/755 |
| 2023/0215190 A1* | 7/2023 | Rezaei | G06V 10/82 |
| | | | 382/181 |

* cited by examiner

CONTROL DEVICE FOR VEHICLE, CONTROL METHOD FOR VEHICLE, AND NONTRANSITORY COMPUTER STORAGE MEDIUM

FIELD

The present disclosure relates to a control device for vehicle, a control method for a vehicle, and a nontransitory computer storage medium.

BACKGROUND

Japanese Unexamined Patent Publication No. 2010-49382 discloses a conventional lane departure warning system configured so as to change a lane departure judgment line in accordance with results of judgment of whether a dividing line of a current lane (for example, a white line, yellow line, etc.) is a solid line or a broken line.

SUMMARY

At the outside of a dividing line of a current lane, sometimes a guide lane (zebra zone) or other neutral zone not corresponding to the current lane or an adjacent lane is provided. Running in a neutral zone is not prohibited, so depending on the traffic conditions etc., sometimes after checking safety, a vehicle is allowed to run while part or all has entered the neutral zone. Therefore, in a vehicle having a warning function or automatic steering function or other lane departure prevention function, if setting a lane departure judgment line without considering such a neutral zone, the lane departure prevention functions are liable to be excessively actuated.

The present disclosure was made focusing on such a problem and has as its object to keep the lane departure prevention functions from being excessively actuated.

To solve the above problem, the control device for a vehicle according to one aspect of the present disclosure detects road markings on a road based on outside environment data relating to an environment around the vehicle, performs driver's assistance for warning of or avoiding departure of the vehicle from a running lane based on results of detection of the road markings, and, if the road markings include markings indicating a neutral zone in which running of the vehicle is not recommended, changes the conditions for actuation of driver's assistance so that driver's assistance with respect to entry of the vehicle into the neutral zone is suppressed.

Further, the control method for a vehicle according to another aspect of the present disclosure detects road markings on a road based on outside environment data relating to an environment around the vehicle, performs driver's assistance for warning of or avoiding departure of the vehicle from a running lane based on results of detection of road markings, and, if the road markings include markings indicating a neutral zone in which running of the vehicle is not recommended, changes the conditions for actuation of driver's assistance so that driver's assistance with respect to entry of the vehicle into the neutral zone is suppressed.

Further, the nontransitory computer storage medium including a computer program for a control device for a vehicle according to still another aspect of the present disclosure makes a control device detect road markings on a road based on outside environment data relating to an environment around the vehicle, perform driver's assistance for warning of or avoiding departure of the vehicle from a running lane based on results of detection of road markings, and, if the road markings include markings indicating a neutral zone in which running of the vehicle is not recommended, change the conditions for actuation of driver's assistance so that driver's assistance with respect to entry of the vehicle into the neutral zone is suppressed.

According to these aspects of the present disclosure, if the road markings include markings indicating a neutral zone, the conditions for actuation of driver's assistance are changed so that driver's assistance regarding entry of the vehicle into the neutral zone is suppressed, so it is possible to keep the lane departure prevention functions from being excessively actuated when a vehicle is made to enter a neutral zone.

DESCRIPTION OF EMBODIMENTS

Figure 1:
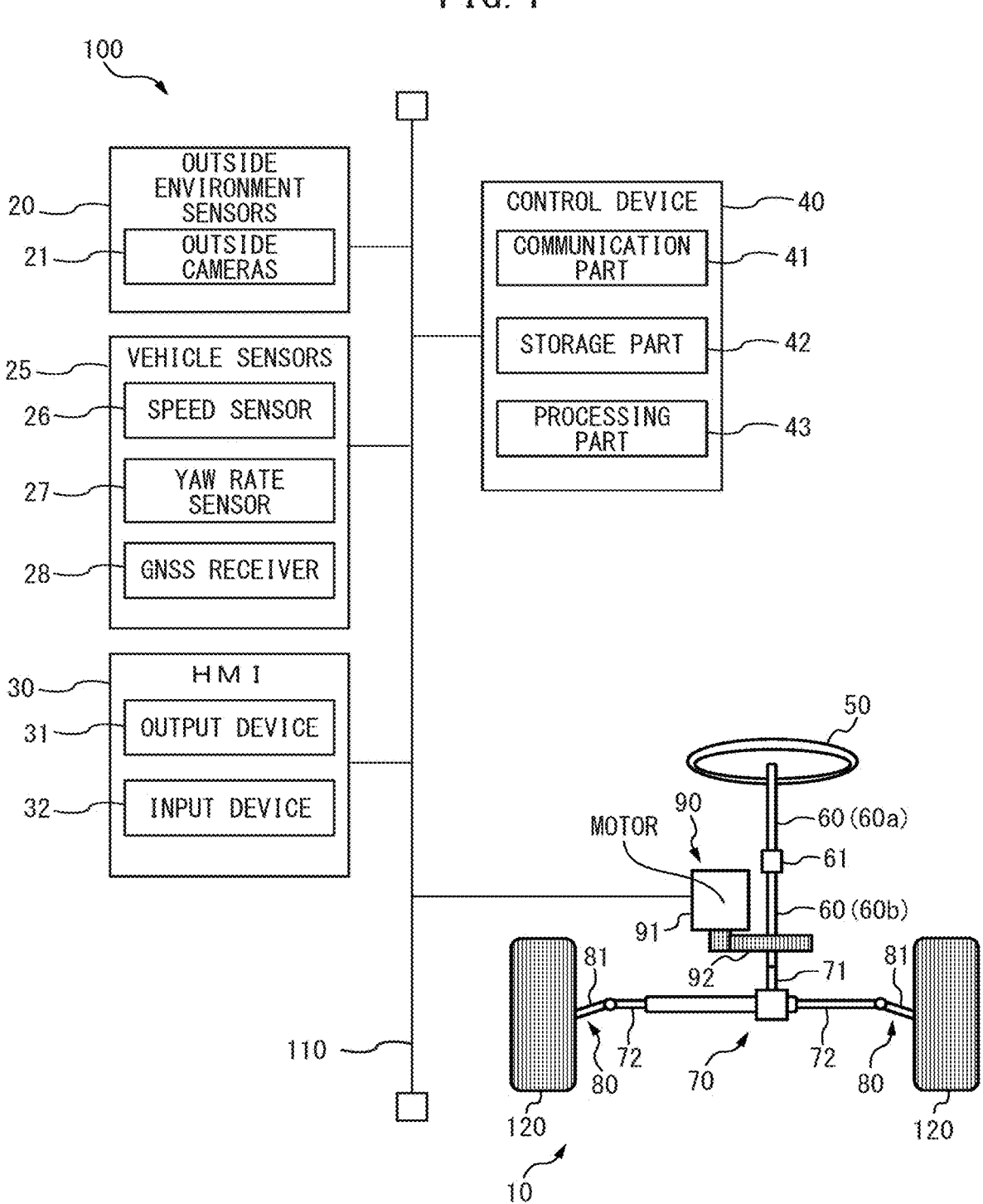
FIG. 1 is a schematic view of the system configuration according to one embodiment of the present disclosure.

Below, embodiments of the present disclosure will be explained in detail with reference to the drawings. Note that, in the following explanation, similar component elements are assigned the same reference numerals. Further, in this Description, vehicles obey the traffic rules of countries mandating left-side driving.

FIG. 1 is a schematic view of the system configuration of a host vehicle 100 according to one embodiment of the present disclosure.

The host vehicle 100 is provide with a steering system 10, outside environment sensors 20, vehicle sensors 25, human machine interface (below, referred to as an "HMI") 30, and control device 40. The steering system 10, outside environment sensors 20, vehicle sensors 25, HMI 30, and control device 40 are respectively connected to be able to communicate through an internal vehicle network 110 based on the standard of a "Controller Area Network".

The steering system 10 is a system for making the left and right wheels 120 of the vehicle (below, referred to as "steered wheels") turn to change the direction of advance of the vehicle. The steering system 10 according to the present embodiment is provided with a steering wheel 50, steering column 60, rack and pinion type gear mechanism 70 including a pinion shaft 71 and rack shaft 72, a link mechanism 80 linking the gear mechanism 70 and steered wheels 120, and a steering assistance mechanism 90. Note that, in the present embodiment, as the steering system 10, one configured mechanically connecting the steering wheel 50 and steered wheels 120 is illustrated, but the steering system 10 may also be one of a steer-by-wire configuration not mechanically connecting these.

The steering wheel 50 is provided at the driver's seat of the vehicle and is operated by the driver of the vehicle. The driver of the vehicle operates the steering wheel 50 to make the steering wheel 50 turn whereby the steering angle of the steered wheels 120 is changed through the steering column 60, gear mechanism 70, and link mechanism 80 and the direction of advance of the vehicle changes.

The steering column 60 is connected at one end to the steering wheel 50 and rotates together with the steering wheel 50 and is connected at the other end side with the pinion shaft 71 of the gear mechanism 70. The steering column 60 is divided into a steering wheel 50 side steering input shaft 60a and gear mechanism 70 side steering output shaft 60b. These are connected by a torsion bar 61 twisted in accordance with the direction and magnitude of the steering torque given by the steering wheel 50 and acting on the steering column 60.

The gear mechanism 70 is configured to convert the rotary motion of the pinion shaft 71 to left and right linear motion along the axial direction of the rack shaft 72. The pinion shaft 71 is connected at one end side with the steering output shaft 60b and rotates together with the steering column 60. The outer circumferential surface of the other end side of the pinion shaft 71 is formed with a pinion gear. The rack shaft 72 extends to the left and right substantially parallel to the vehicle width direction. Part of its outer circumferential surface is formed with a rack gear intermeshing with the pinion gear. Due to this, if the pinion shaft 71 rotates, the rack shaft 72 moves to the left and right along the axial direction in accordance with the rotational direction.

The link mechanism 80 is provided with tie rods 81 attached to the two ends of the rack shaft 72, knuckle arms (not shown) connected to the tie rods 81 and supporting the steered wheels 120, etc. and is configured so as to be able to transmit the left and right linear motion of the rack shaft 72 to the steered wheels 120 to change the direction (steering angle).

The steering assistance mechanism 90 is provided with a motor 91 and a reduction gear 92 transmitting output of the motor 91 to the steering output column 60b. The motor 91 is controlled by the control device 40 to generate a motor torque MT and transmits the motor torque MT through the reduction gear 92 to the steering output column 60b. Due to this, it is possible to lighten the steering force of the steering wheel 50 and possible to automatically perform the steering operation of the steering wheel 50.

The outside environment sensors 20 are sensors for generating data relating to the environment around the host vehicle 100 (below, referred to as the "outside environment data"). In the present embodiment, as outside environment sensors 20, the host vehicle 100 is provided with one or more outside cameras 21 for capturing the surroundings of the host vehicle 100. The outside cameras 21 capture the surroundings of the host vehicle 100 by a predetermined frame rate (for example, 10 Hz to 40 Hz) and generate camera images in which the surroundings of the host vehicle 100 are shown. The outside cameras 21 transmit the generated camera images as outside environment data to the control device 40 each time generating camera images.

Note that, in addition to the outside cameras 21, distance sensors etc. for measuring the distances to other vehicles, pedestrians, buildings, and other objects present around the host vehicle 100 may be provided as outside environment sensors 20. As examples of the distance sensors, for example, lidars (light detection and ranging sensors) which emit laser beams and measure distances based on the reflected light, millimeter wave radar sensors which emit electromagnetic waves and measure distances based on the reflected waves, etc. may be mentioned.

The vehicle sensors 25 are sensors for generating data relating to the running speed, posture, and current position of the host vehicle 100 and other states of the host vehicle 100 (below, referred to as the "vehicle data"). In the present embodiment, as vehicle sensors 25, the host vehicle 100 is provided with a speed sensor 26 for detecting the running speed of the host vehicle 100, a yaw rate sensor 27 for detecting the speed of change of the yaw angle at the time of turning of the host vehicle 100, that is, the angular velocity of rotation (yaw rate) about the vertical axis of the host vehicle 100, to detect the posture of the host vehicle 100, a GNSS receiver 28 for detecting the current position of the host vehicle 100, etc.

The HMI 30 is a user interface for transferring information between the host vehicle 100 and its occupants. The HMI 30 is provided with output devices 31 for notifying information to the vehicle occupants through the physical senses of the vehicle occupants (for example, sight, hearing, touch, etc.) and input devices 32 for vehicle occupants to operate for input or operate for response. As the output devices 31, for example, displays (for example, meter display, center display, heads up display, etc.) or lamps, speakers, vibration units, etc. may be mentioned. As input devices 32, for example, a touch panel, operating buttons, operating switches, a microphone, etc. may be mentioned.

In the present embodiment, the HMI 30 displays information corresponding to a display signal received from the control device 40 through the internal vehicle network 110 (for example, text information or graphic information) on the displays and outputs sound corresponding to an audio signal from the speakers. Further, the HMI 30 transmits data input by occupants through the input device 32 (below, referred to as the "occupant input data") through the internal vehicle network 110 to the control device 40.

The control device 40 is an ECU (electronic control unit) provided with a communication part 41, storage part 42, and processing part 43.

The communication part 41 is provided with an interface circuit for connecting the control device 40 to the internal vehicle network 110. The communication part 41 supplies data received from the outside (for example, outside environment data, vehicle data, occupant input data, etc.) to the processing part 43. Further, the communication part 41 transmits the display signal and audio signal output from the processing part 43 to the HMI 30 and outputs a motor control signal to the motor 91.

The storage part 42 has an HDD (hard disk drive) or SSD (solid disk drive), semiconductor memory, or other storage medium and stores the various computer programs, data, etc. used for processing at the processing part 43.

The processing part 43 has one or more CPUs (central processing units) and their peripheral circuits. The processing part 43 runs various computer programs stored in the storage part 42 and is for example a processor.

If giving an example of the processing which the processing part 43 performs, the processing part 43 detects the road markings on the road (dividing lines and limit signs, instruction signs, and other road signs) based on the camera images included in the outside environment data and recognizes the lane in which the host vehicle 100 is running (below, referred to as the "current lane"). Typical examples of dividing lines are white lines and yellow lines on the road. Typical examples of road markings are arrows showing to proceed straight, turn right, turn left, and otherwise indicating directions in which a vehicle can proceed and a guide lane (zebra zone) provided at a location on a road which running of vehicles has to be guided.

Further, the processing part 43 judges whether the host vehicle 100 is liable to depart from the current lane based on the results of recognition of the current lane, the vehicle data, etc. and, if it is liable, warns the vehicle occupants by informing them that the host vehicle 100 is liable to depart from the current lane (below, referred to as a "lane departure warning") through the output device 31 of the HMI 30. Specifically, the processing part 43 basically sets the left and right dividing lines of the current lane as lane departure judgment lines, predicts the position reached by the front wheels of the host vehicle 100 after the elapse of a predetermined time period (for example, after several seconds) based on the position of the host vehicle 100 in the lane, the direction of advance of the host vehicle 100, the running speed of the host vehicle 100, etc. and issues the lane departure warning if it is estimated that the front wheels will reach the lane departure judgment line after the elapse of the predetermined time period.

The lane departure warning may be given by the displays or lamps through the visual sense of the driver, may be given by the speakers through the auditory sense of the driver, may be given by vibration units mounted in the driver's seat etc. through the tactile sense of the driver, and may be given by a combination of the same. Further, if it is estimated that the front wheels will reach a lane departure judgment line after the elapse of a predetermined time period, together with the lane departure warning or in place of the lane departure warning, it is also possible to perform steering assist where the steering assistance mechanism 90 automatically performs the steering operation of the steering wheel 50 so that the host vehicle 100 does not depart from the current lane.

In this regard, sometimes a neutral zone not corresponding to either a current lane or a running lane adjacent to the current lane (below, simply referred to as an "adjacent lane" is provided outside of the dividing lines of the current lane by for example being defined by white lines painted on the road surface. A typical example of a neutral zone is a guide zone (zebra zone) defined by white lines painted in stripes on the road surface. Running through a neutral zone is not recommended, but is not prohibited, so depending on traffic conditions etc., sometimes after confirming safety, the host vehicle may run while being made to depart from the current lane and enter the neutral zone in part or whole.

For this reason, if for example ending up setting the left and right dividing lines of the current lane as lane departure judgment lines without considering the presence of such a neutral zone, the lane departure warning and steering assist, that is, the driver's assistance functions for suppressing lane departure (below, referred to as the "lane departure prevention functions"), are liable to be excessively actuated. As a result, the vehicle occupants are liable to feel bothered by the lane departure prevention functions.

Therefore, in the present embodiment, if a neutral zone is provided at the outside of the current lane, compared to when no neutral zone is provided, the lane departure judgment lines are set so that the lane departure prevention functions become harder to actuate. Below, the control for setting the lane departure judgment lines according to the present embodiment will be explained while referring to FIG. 2 and FIG. 3.

Figure 2:
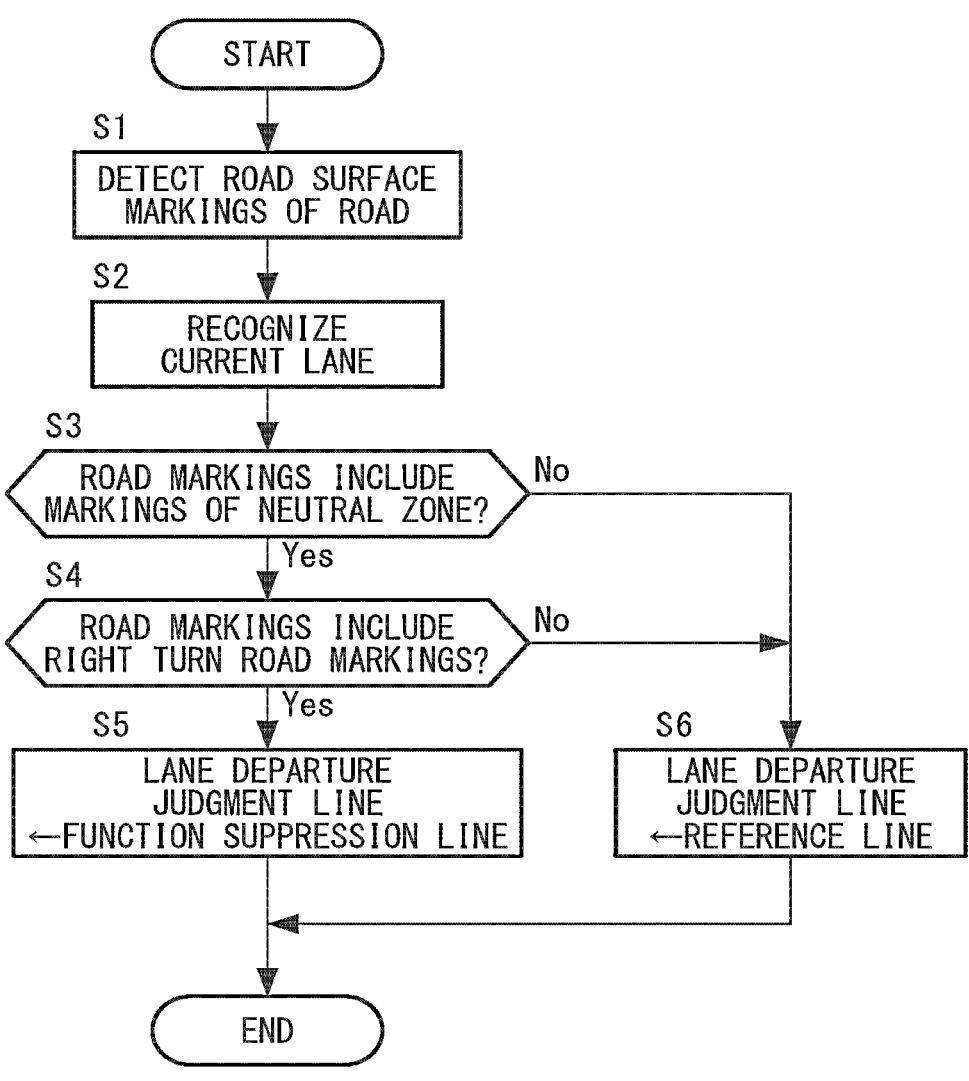
FIG. 2 is a flow chart for explaining details of control for setting a lane departure judgment line according to one embodiment of the present disclosure.
Figure 3:
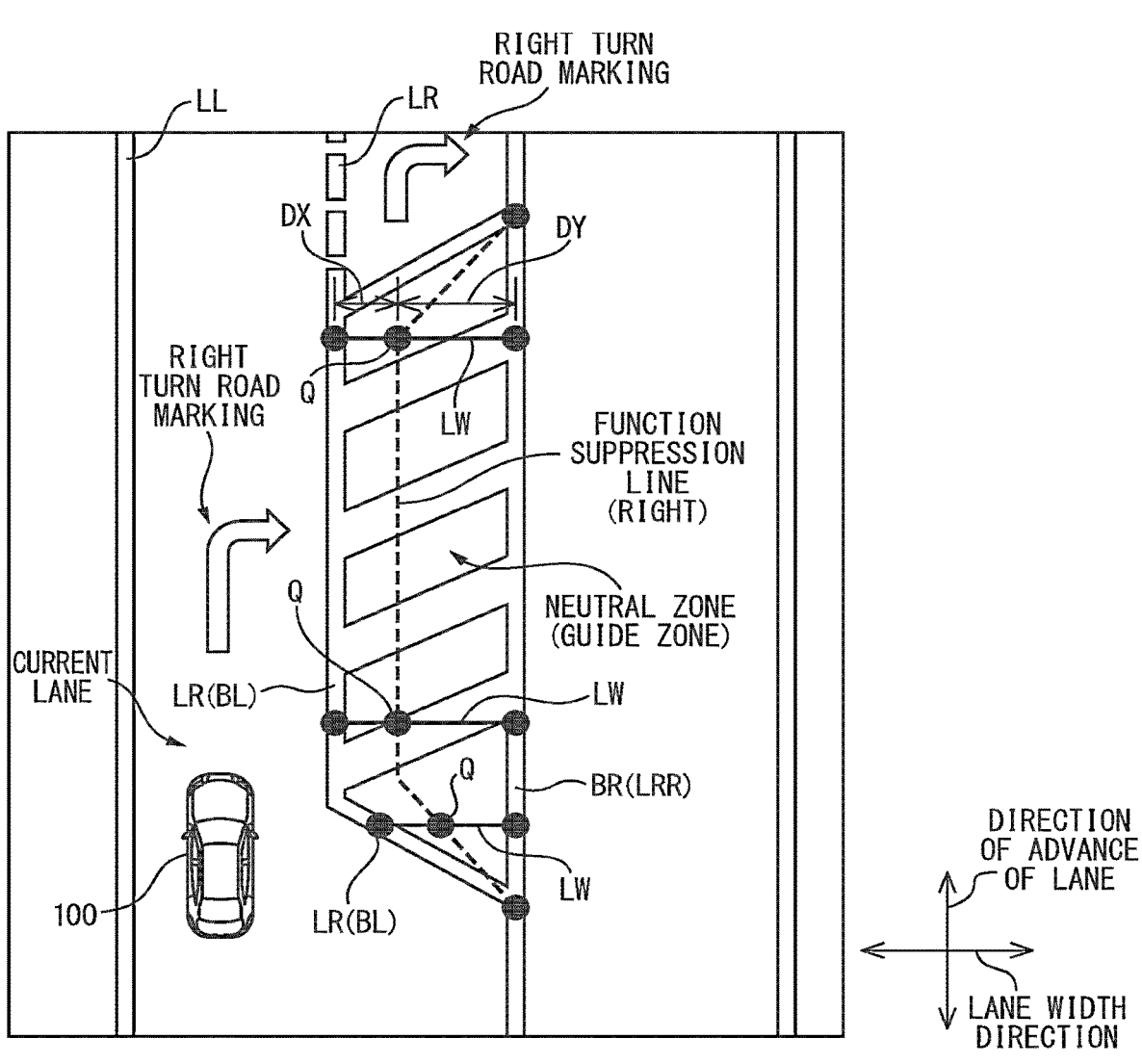
FIG. 3 is a view showing one example of a scenario in which the vehicle is running on a road provided at the outside of a running lane of the vehicle with a neutral zone having a dividing line of the running lane as part of its boundary lines.

FIG. 2 is a flow chart for explaining the detailed method of control for setting lane departure judgment lines performed by the processing part 43 and in turn the control device 40. FIG. 3 is a view showing one example of a scenario in which a host vehicle 100 is running on a road provided, at the outside of the current lane, with a neutral zone having a dividing line of the current lane as part of its boundary lines.

At step S1, the control device 40 detects road markings on a road by processing the camera images received from the outside cameras 21 by for example edge detection processing or various other image processing. Note that, the detection of road markings on the road is not limited to such a method. It can be performed by various known methods.

At step S2, the control device 40 recognizes the running lane of the host vehicle defined by the left and right dividing lines LL, LR (below, referred to as the "current lane") based on the dividing lines LL, LR at the left and right of the host vehicle among the detected road markings (see FIG. 3).

At step S3, the control device 40 judges whether the detected road markings include markings showing a neutral zone. In the present embodiment, if the detected road markings include a guide lane (zebra zone) having a dividing line of the current lane as part of its boundary lines, the control device 40 proceeds to the processing of step S4. On the other hand, if the detected road markings do not include a guide lane (zebra zone), the control device 40 proceeds to the processing of step S6.

At step S4, the control device 40 judges whether the detected road markings include a right turn arrow or other right turn road marking (left turn road marking if country in which right side driving is mandated). In the present embodiment, if the detected road markings include a right turn road marking showing that the lane in the front guided to by a guide lane is a right turn lane, the control device 40 proceeds to the processing of step S5. On the other hand, if the detected road markings do not include a right turn road marking, the control device 40 proceeds to the processing of step S6.

Note that, in the present embodiment, such conditions are set at this step S4 for the following reason. That is, while entry to a guide lane is not prohibited, it is not recommended, so this is to enable suppression of the lane departure prevention functions in a scenario where entry into the guide lane is particularly easy, that is, only a scenario where there is a right turn only lane in front of the guide lane. Therefore, in another embodiment, this step S4 may be omitted and the control device 40 may be made to directly proceed to step S5 if the detected road markings include a neutral zone.

At step S5, the control device 40 sets a lane departure judgment line for the function suppression line. The function suppression line is made a virtual line enabling part or all of the host vehicle to go beyond a dividing line of the current lane to enter a neutral zone having that dividing line as part of its boundary lines without causing actuation of the lane departure prevention functions.

In the present embodiment, the control device 40, for example, as shown in FIG. 3, sets a right side function suppression line of the host vehicle 100 based on a right side dividing line LR of the current lane and a right side boundary line BR of the neutral zone (guide lane) having the dividing line LR as its left side boundary line BL. More specifically, the control device 40 sets as the right side function suppression line of the host vehicle 100 a virtual line connecting internal division points Q dividing, by a predetermined internal division ratio, line segments LW parallel to a lane width direction (direction vertical to the direction of advance of the lane) connecting in the direction of lane advance a right side dividing line LR of the current lane and a right side boundary line BR of the neutral zone (guide lane) having the dividing line LR as its left side boundary line BL. Note that the left side function suppression line of the host vehicle 100 is for example set as the left side dividing line LL of the current lane.

If the distance from the dividing line LR to an internal division point Q is defined as "DX" and the distance from an internal division point Q to the boundary line BR is defined as "DY", for example, by making the internal division ratio DX:DY the value of 1:1, a virtual line connecting the center parts of the line segments LW in the direction of advance of the lane can be made the function suppression line. That is, it is possible to set the function suppression line at the center of the neutral zone. Further, for example, by making the internal division ratio DX:DY the value of 2:1 and otherwise making DX larger than DY, it is possible to shift the function suppression line from the center of the neutral zone to the boundary line BR side. Conversely, by making the internal division ratio DX:DY the value of 1:2 etc. and otherwise making DX smaller than DY, it is possible to shift the function suppression line from the center of the neutral zone to the dividing line LR side. In this way, by setting the internal division ratio DX:DY so that the internal division point Q is positioned inside of the neutral zone, that is, by setting the function departure line inside of the neutral zone, it is possible to suppress actuation of the lane departure prevention functions with respect to the dividing line of the current lane forming a boundary line of the neutral zone.

Further, it is also possible to make DY 0 and make the boundary line BL the function suppression line. By doing this, it is possible to suppress the actuation of the lane departure prevention functions with respect to the neutral zone. Note that, the boundary line BL may also be, in other words, the adjacent dividing line LRR of the dividing line LR of the current lane.

Whatever the case, it is sufficient to suitably set the internal division ratio DX:DY. Further, the internal division ratio DX:DY may be a ratio fixed in advance or may be changed in accordance with the surrounding traffic conditions (congested or not congested), the running speed of the host vehicle 100, etc. For example, at the time of congestion, sometimes entry into a neutral zone will enable smoother travel, so compared with noncongestion, the internal division ratio DX:DY may be changed so that the function suppression line shifts to the boundary line BR side. The method of judging the surrounding traffic conditions is not particularly limited. For example, they may be judged based on outside environment data, the average value of the running speeds of the host vehicle 100 in a fixed time period, etc.

At step S6, the control device 40 sets the lane departure judgment lines to reference lines. The reference lines are made virtual lines at which the host vehicle is liable to depart from the current lane or where it can be judged that the host vehicle has actually departed from the current lane. In the present embodiment, the control device 40 sets the left and right dividing lines LL, LR of the current lane as the reference lines.

The control device 40 for the host vehicle 100 according to the present embodiment explained above is configured to detect road markings on the road based on outside environment data relating to the environment around the host vehicle 100 and perform driver's assistance for warning of or avoiding departure from the current lane (running lane of host vehicle 100) based on the results of detection of road markings and, if the road markings include markings showing a neutral zone in which running of the host vehicle 100 is not recommended, to change the conditions for actuation of driver's assistance so that driver's assistance with respect to entry into the neutral zone is suppressed.

In this way, according to the present embodiment, if the road markings include markings showing a neutral zone, the conditions for actuation of driver's assistance are changed so that driver's assistance is suppressed with respect to entry of the vehicle to the neutral zone, so it is possible to keep the lane departure prevention functions from being excessively actuated when making a vehicle enter the neutral zone.

The control device 40 according to the present embodiment is configured so as to change the conditions for actuation of driver's assistance so that at least driver's assistance is suppressed with respect to entry into the neutral zone straddling a boundary line extending at a slant toward the direction of advance of the current lane among the boundary lines of the neutral zone defining the neutral zone.

Due to this, in a scenario in which running so as to cut through the neutral zone after checking for safety would enable smoother travel, it would be possible to keep lane departure prevention functions from being excessively actuated.

For example, the control device 40 can be configured so as to set the lane departure judgment lines used for judging departure from the current lane based on the results of detection of road markings and, if the dividing line LR of the current lane forms a boundary line BL of part of a neutral zone, set the lane departure judgment line (departure judgment line) in the neutral zone.

In more detail, the control device 40 can be configured so as to set as a lane departure judgment line a virtual line connecting internal division points Q dividing by a predetermined internal division ratio the line segments LW parallel to a lane width direction vertical to the direction of advance of the current lane connecting a dividing line LR of the current lane and an adjacent dividing line LLR of the dividing line LR of the current lane forming a boundary line of another part of the neutral zone.

By setting the internal division ratio so that the internal division points Q are positioned inside of the neutral zone in this way, that is, by setting the lane departure judgment line inside of the neutral zone, it is possible to keep the lane departure prevention functions with respect to the dividing line LR of the current lane forming the boundary line BL of the neutral zone from being actuated.

At this time, by changing the internal division ratio based on the traffic conditions around the host vehicle 100 or the running speed, it is possible to suitably suppress actuation of the lane departure prevention functions according to the traffic conditions or running speed.

Further, the control device 40 can also be configured to set as a lane departure judgment line the adjacent dividing line LRR of the dividing line LR of the current lane forming the boundary line of another part of the neutral zone if the dividing line LR of the current lane forms the boundary line BL of part of the neutral zone.

Due to this, it is possible to suppress actuation of the lane departure prevention functions with respect to a neutral zone as a whole.

Further, in the present embodiment, the neutral zone is a guide lane (zebra zone) defined by boundary lines painted on the road surface and the control device 40 is configured so that if the road markings include markings indicating a guide lane and include markings indicating that the running lane which the guide lane guides to is a right turn lane, it changes the conditions for actuation of driver's assistance so that driver's assistance with respect to entry into the neutral zone is suppressed.

While entry into the guide lane is not prohibited, it is not recommended, so by adopting such a constitution, it is possible to suppress actuation of the lane departure prevention functions for a scenario where entry into the guide lane is particularly easy, that is, only a scenario where there is a right turn only lane in front of the guide lane.

Further, in the present embodiment, if the road markings do not include markings indicating a neutral zone, the control device 40 is configured to set the left and right dividing lines LL, LR of the current lane as the departure judgment lines.

Due to this, if no neutral zone is detected, the host vehicle 100 can be kept from departing from the current lane.

Above, embodiments of the present disclosure were explained, but the above embodiments only show some of the examples of application of the present disclosure and are not intended to limit the technical scope of the present disclosure to the specific constitutions of the above embodiments.

For example, the present embodiment detected the road markings based on the camera images, but it is also possible to detect road markings based on fusion data (FNS data) obtained by combining camera images and data obtained from the distance sensors.

Further, when judging that there is an opposing vehicle in the opposing lane, when predicting that the opposing vehicle will enter the neutral zone based on the direction of advance of the opposing vehicle, etc., it is also possible to not set the lane departure judgment lines as function suppression lines but to set the lane departure judgment lines as for example the left and right dividing lines LL, LR of the current lane, that is, the reference lines, and issue a warning and assist steering earlier.

Further, in the above embodiments, the neutral zone may also be a zone in which road markings prohibiting parking are present.

Further, in the above embodiments, the computer program run in the control device 40 may be provided in a form stored in a computer readable portable storage medium such as a semiconductor memory, magnetic recording medium, or optical recording medium.

The invention claimed is:

1. A control device for a vehicle, wherein the control device is configured to:

detect road markings on a road based on outside environment data relating to an environment around the vehicle;

perform driver's assistance for warning of or avoiding departure of the vehicle from a running lane based on results of detection of road markings, the running lane being a current lane of the vehicle; and, if the road markings outside of the running lane include markings indicating a neutral zone in which running of the vehicle is not recommended, change conditions for actuation of driver's assistance so that driver's assistance with respect to entry into the neutral zone is suppressed.

2. The control device for a vehicle according to claim 1, wherein the control device is further configured to:

set a departure judgment line used for judging departure of the vehicle from the running lane based on the results of detection of the road marking; and set the departure judgment line in the neutral zone if a dividing line of the running lane of the vehicle forms a boundary line of part of the neutral zone.

3. The control device for a vehicle according to claim 2, wherein the control device is further configured to set as the departure judgment line a virtual line connecting internal division points dividing by a predetermined internal division ratio line segments parallel to a lane width direction vertical to a direction of advance of the running lane connecting a dividing line of the running lane of the vehicle and an adjacent dividing line of the dividing line forming the boundary line of another part of the neutral zone.

4. The control device for a vehicle according to claim 3, wherein the control device is further configured to change the internal division ratio based on traffic conditions around the vehicle or a running speed of the vehicle.

5. The control device for a vehicle according to claim 2, wherein the control device is further configured to:

set a departure judgment line used for judging departure of the vehicle from the running lane based on the results of detection of the road marking; and set as the departure judgment line an adjacent dividing line of the dividing line forming a boundary line of another part of the neutral zone if a dividing line of the running lane of the vehicle forms a boundary line of part of the neutral zone.

6. The control device for a vehicle according to claim 1, wherein the neutral zone is a guide lane defined by boundary lines painted on a road surface, and the control device is further configured so that if the road markings include markings indicating the guide lane and include markings indicating that the running lane which the guide lane guides to is a right turn lane, it changes the conditions for actuation of driver's assistance so that driver's assistance with respect to entry into the neutral zone is suppressed.

7. The control device for a vehicle according to claim 2, wherein the control device is further configured to set as the departure judgment line a dividing line of the running lane of the vehicle if the road markings do not include markings indicating a neutral zone.

8. The control device for a vehicle according to claim 1, wherein the control device is further configured to change the conditions for actuation of driver's assistance so that at least the driver's assistance is suppressed with respect to entry into the neutral zone straddling a boundary line extending at a slant toward a direction of advance of the running lane among the boundary lines of the neutral zone defining the neutral zone.

9. A control method for a vehicle, wherein the control method:

detects road markings on a road based on outside environment data relating to an environment around the vehicle;

performs driver's assistance for warning of or avoiding departure of the vehicle from a running lane based on results of detection of road markings, the running lane being a current lane of the vehicle; and, if the road markings outside of the running lane include markings indicating a neutral zone in which running of the vehicle is not recommended, changes conditions for actuation of driver's assistance so that the driver's assistance with respect to entry of the vehicle into the neutral zone is suppressed.

10. A nontransitory computer storage medium including a computer program for a control device for a vehicle, wherein the nontransitory computer storage medium including a computer program makes a control device:

detect road markings on a road based on outside environment data relating to an environment around the vehicle;

perform driver's assistance for warning of or avoiding departure of the vehicle from a running lane based on results of detection of road markings, the running lane being a current lane of the vehicle; and, if the road markings outside of the running lane include markings indicating a neutral zone in which running of the vehicle is not recommended, change conditions for actuation of driver's assistance so that the driver's assistance with respect to entry of the vehicle into the neutral zone is suppressed.

\* \* \* \* \*